J. MASON.
Radiators.

No. 153,776. Patented Aug. 4, 1874.

Witnesses
John Becker
Fred. Haynes

Joshua Mason
by his Attorneys
Brown & Allen

UNITED STATES PATENT OFFICE.

JOSHUA MASON, OF PATERSON, NEW JERSEY.

IMPROVEMENT IN RADIATORS.

Specification forming part of Letters Patent No. 153,776, dated August 4, 1874; application filed June 22, 1874.

*To all whom it may concern:*

Be it known that I, JOSHUA MASON, of Paterson, in the county of Passaic and State of New Jersey, have invented an Improvement in Radiators, also applicable to condensers and other purposes, of which the following is a specification:

This invention more particularly relates to a combination of inner and outer tubes in tubular heaters or condensers, whereby both inside and outside heating or condensing surfaces are obtained, and a free or uninterrupted passage through the inner tubes, separately or independently of each other, is produced.

The invention consists in a nut for closing the joints around the inner tubes at their one end, and of the connections which unite the outer tubes at the same end, such nut being constructed on its opposite sides or ends with screw-threads of different diameters, but of similar pitch, both either right or left hand, also preferably being corrugated between its ends to provide for unequal expansion of inner and outer tubes which it serves indirectly to connect. The invention likewise consists in a double nut or direct connection of the inner and outer tubes at their opposite ends, having screw-threads of different diameters, but which may be of similar pitch on reverse sides of said connection, and at both or opposite ends thereof. These several nuts or connections form readily-applied and sure means for putting together and making tight or secure the inner and outer tubes of the apparatus.

Figure 1:
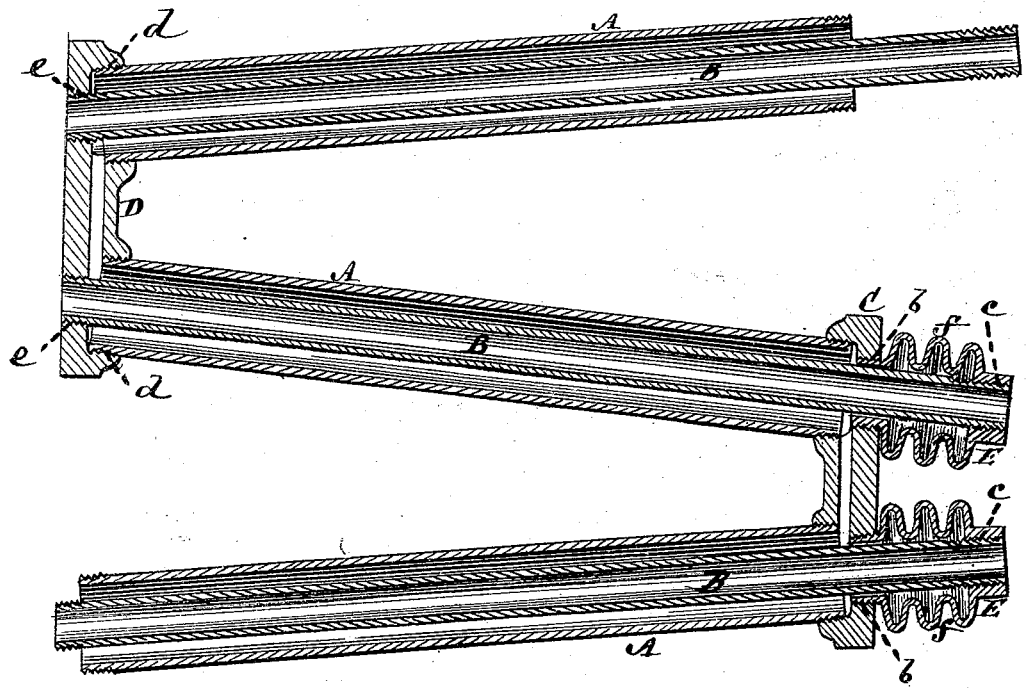
Figure 2:
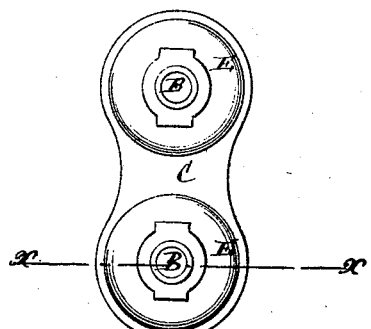
Figure 3:

In the accompanying drawing, Figure 1 represents a longitudinal sectional elevation of an apparatus in part constructed in accordance with my invention; Fig. 2, a face view of the one hollow connection used therein; and Fig. 3, a transverse section thereof on the line $x\ x$, with the nut omitted.

Supposing the invention to be applied to a steam-radiator, then steam, which is introduced into the outer tubes A, circulates therethrough and around or on the outside of inner detached open-ended tubes B by means of hollow connections C D at opposite ends of the concentrically-disposed inner and outer tubes. By this arrangement of the tubes both an inner and an outer radiating-surface is obtained. The hollow connections C have simply the outer tubes A, at their one end, screwed into or, it may be, on them, and the joint with such connections around the separate or independent open-ended inner tubes B, also the joint at the same ends of the inner tubes B closed by means of a nut, E, constructed at its opposite sides or ends with screw-threads $b\ c$ of different diameters, but of similar pitch, or thereabout, and both threads running in the same direction—that is, right or left hand, as the case may be—said nuts screwing into, or it may be onto, the hollow connection C, and onto or over the outer end of each inner tube B. This makes a perfectly steam-tight joint at such end of the inner and outer tubes, and one which is easily closed by the simple application of a single nut.

To provide, however, for the unequal expansion and contraction of the inner and outer tubes, the nuts E are made hollow and corrugated, as at $f$, which enables their bodies to yield between the screw-threads on their opposite ends or faces. The opposite ends of the inner and outer tubes A B are, on the other hand, directly connected by the hollow connections D, but in a similar manner by means of screw-threads $d\ e$ of different diameters, but which may be of similar pitch on reverse sides of said connections, and at both or opposite ends thereof, said screw-threads fitting corresponding screw-threads on the ends of the tubes A and B, so that the hollow connections D form what may be termed double nuts, which are easily applied or disconnected, as required.

In the arrangement or combination of parts here shown and described, as applied to a radiator, of course the inner tubes B are free-air tubes. Applied to a condenser, the exterior surfaces of the outer tubes A and interior surfaces of the inner tubes B are under exposure to the water or condensing medium, and a like exposure takes place when such combination or system of tubes is applied to boiling purposes.

I claim—

1. The combination, with the outer tubes A and the inner tubes B, of nuts having screw-threads $b\ c$ on their opposite sides or ends of different diameters, but of similar pitch and direction, and the hollow connections C, essentially as shown and described.

2. The hollow corrugations $ff$ between the larger and smaller screw-threads of the nuts E, in combination with the pipes B and hollow connections C, substantially as and for the purpose herein set forth.

3. The combination, with the outer tubes A and the inner tubes B, of the double nuts or hollow connections D, constructed with screw-threads $d\ e$ of different diameters on reverse sides and at their opposite sides, essentially as described.

JOSHUA MASON.

Witnesses:
 JOHN B. MASON,
 M. I. QUIN.